United States Patent
Lagoutte

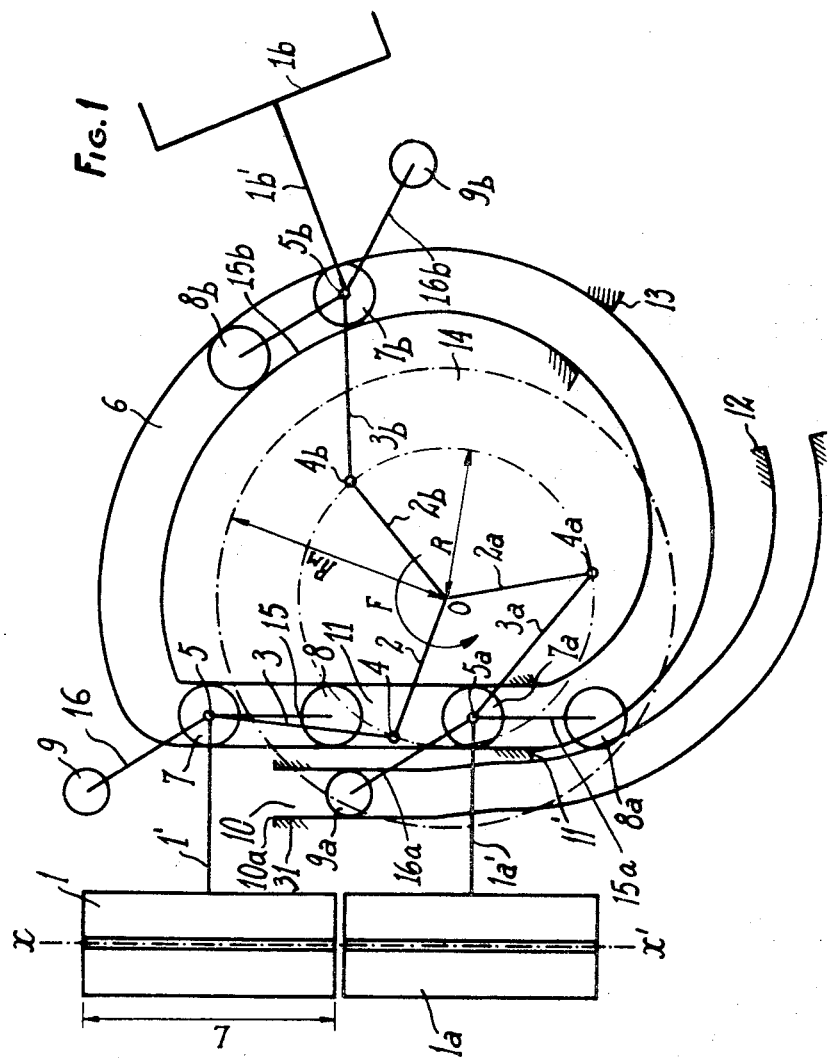

[15] 3,685,938
[45] Aug. 22, 1972

[54] APPARATUS FOR FORMING HOLLOW BODIES

[72] Inventor: Serge Lagoutte, Chalon-sur-Saone, France

[73] Assignee: Societe d'Etudes Verrieres Appliquees "S.E.V.A.", Neuilly-sur-Seine (Hauts-de-Seine), France

[22] Filed: Aug. 7, 1970

[21] Appl. No.: 61,998

[30] Foreign Application Priority Data

Aug. 12, 1969 France......................6927662

[52] U.S. Cl. ..................425/185, 425/233, 425/305, 425/326
[51] Int. Cl. ............................B29c 3/00, B29d 23/03
[58] Field of Search.........18/5 BP, 5 BE, 20 B; 74/63

[56] References Cited

UNITED STATES PATENTS

| | | |
|---|---|---|
| 3,310,834 | 3/1967 | Simpson et al..............18/5 BP |
| 2,579,399 | 12/1951 | Ruekberg....................18/5 BP |
| 3,334,379 | 8/1967 | Settembrini................18/5 BP |
| 3,496,599 | 2/1970 | Bronn........................18/5 BP |
| 3,546,747 | 12/1970 | Stefaniak et al............18/20 B |

*Primary Examiner*—J. Spencer Overholser
*Assistant Examiner*—Michael O. Sutton
*Attorney*—Pennie, Edmonds, Morton, Taylor and Adams

[57] ABSTRACT

A machine for blow molding hollow bodies such as bottles from extruded tubular plastic material includes a plurality of molds which are guided over a closed path including a straight portion coaxial with the extruder by means of a first follower constrained to follow a closed loop path and second and third followers engaging with guide surfaces which extend over fractions of a closed loop path.

4 Claims, 4 Drawing Figures

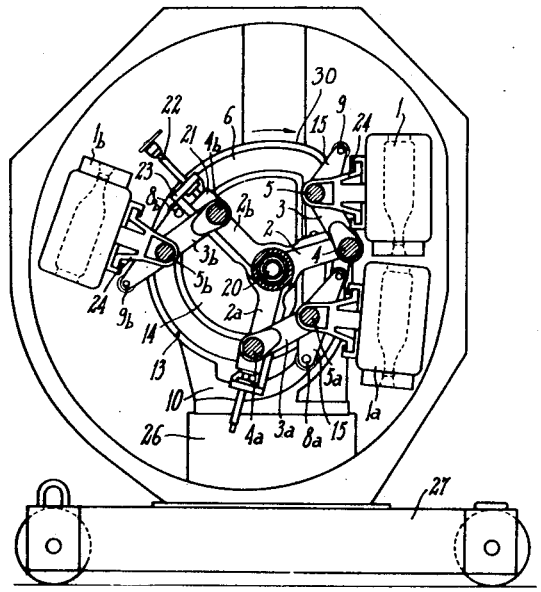

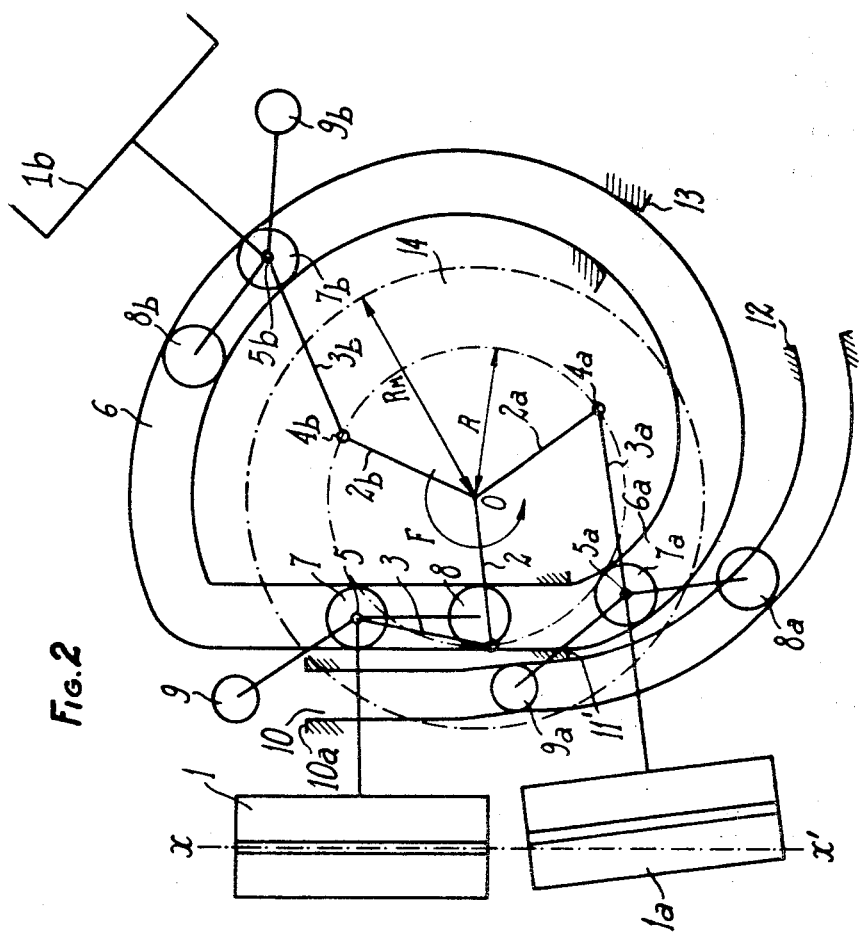

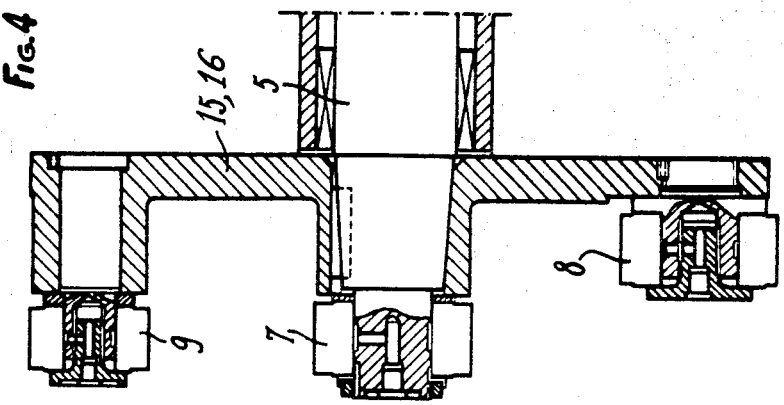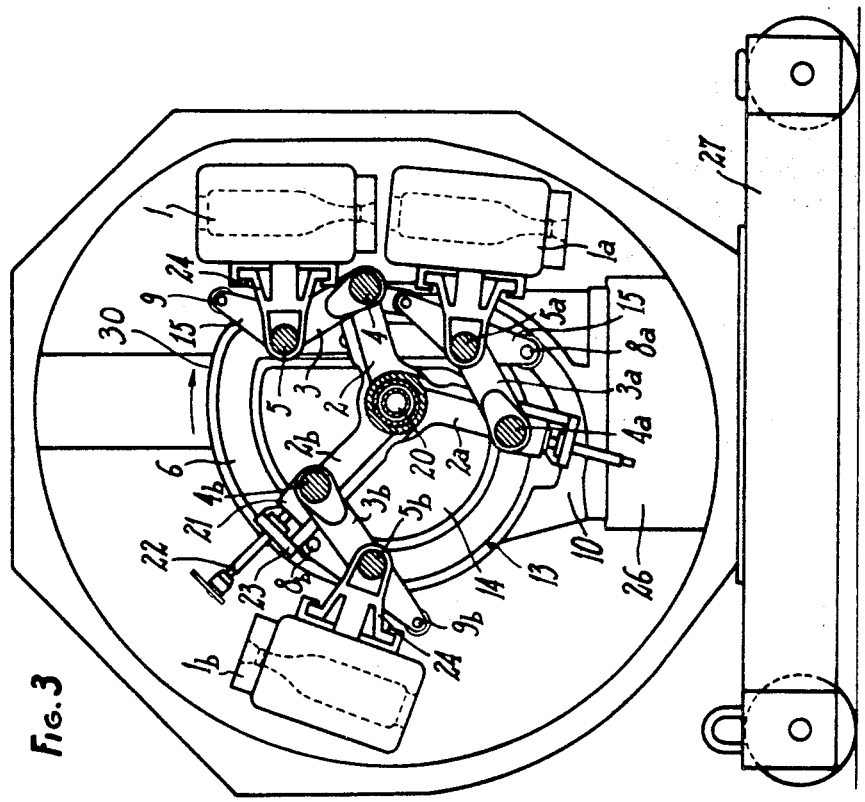

APPARATUS FOR FORMING HOLLOW BODIES

It has been heretofore proposed to make hollow objects of plastic material by blowing them in molds from short lengths of tubular plastic material continuously extruded from a die.

In machines employed for this purpose there is generally provided a mold carrier, which may have a rotary motion for example. This carrier supports a number of molds each made up of two mold halves. By the motion of the carrier the molds move successively through a closed path, at one point of which the opened halves of each mold close upon a length of plastic tubing extending from an extruder. The tubing within the mold is thereupon blown to conform to the desired shape. The carrier then moves the mold on to a subsequent location in the closed path where the mold halves are opened for ejection of the molded piece.

In order to obtain satisfactory operation of a machine of this type it is necessary that before the molds close, the halves thereof be brought to a position which is aligned with the extrusion axis. It is moreover necessary that, after the mold halves have closed, they shall move along a rectilinear path which is coaxial with the extruder axis until the next following mold shall have closed upon the next following section of tubing. It is also necessary that when this next mold closes it be as close as possible to the previous mold in order to minimize the length of plastic tubing which is lost between the two molds and which constitutes waste material.

These two requirements thus imply:

a. articulated mounting of the molds on the carrier therefor, where they undergo a generally rotational motion with constant angular speed, so as to make possible a temporary coaxial positioning of the molds with each other, at least in pairs;

b. guidance of the molds so as to impose upon them during this phase rectilinear motion along a path coaxial with the extruder; and c. compensation of the variations in the radius of gyration of the molds about the principal axis of rotation of the mold carrier during the rectilinear phase of mold motion.

Articulation of the molds does not present any particular problem and is generally realized by mounting the halves of each mold for sliding motion (for purposes of opening and closing the mold) on a cradle which in turn is articulated at each end to the mold carrier along an axis which may be parallel both to the axis of rotation of the carrier and to the direction of motion of the mold halves with respect to each other.

The guidance of the molds required to impose on them the desired rectilinear motion parallel to the extrusion axis can be effected by means of cam followers mounted on the mold-carrying cradles and cooperating with cams or guide surfaces fixed in the machine frame.

As to the compensation for variations in the radius of gyration of the molds during the rectilinear phase of their motion, this can be achieved by various means such as slides, slots, telescopic arms, springs, articulated arms and the like, interposed between the mold carrier and the cradles.

Machines of the several known types which operate on the principle hereinabove described include in general a large number of molds, some 20 or more, mounted substantially in contact with each other so as to cover or occupy substantially the entirety of their own closed trajectory while preserving between adjacent molds as small a spacing as possible since it is this spacing which determines the length of waste plastic between successive molded articles.

There is thus automatically satisfied the desired condition of proximity hereinabove mentioned, namely the condition that between a given mold at the time of its closure and the mold which has preceded it, the spacing be as small as possible. On the other hand, in the known machines above referred to it is not possible arbitrarily to change the number or the dimensions of the molds without also changing their mutual spacing and thereby the amount of material lost.

Moreover machines of these known types accommodate only a relatively large number of molds, which is satisfactory for long production runs only.

Applicant's copending application Ser. No. 774,386, filed Nov. 8, 1968, and assigned to the assignee hereof, discloses a machine which can be employed for short production runs and which can be built for a number of molds as small as three. In the machine of that application, motion of the molds (over part of their path) coaxially or collinearly with respect to the extrusion head requires a movable mounting of the mold-carrying cradles on the mold carrier. In addition the desired proximity between each mold at the time it closes and the preceding mold makes it necessary to change the intermold spacing over the closed path of mold travel, since the length of this closed path is necessarily much greater than the aggregate length of the molds themselves taken end-to-end.

Thus the machine of that application spaces the molds in the desired proximity to each other only in pairs and only at the time when a mold closes on the plastic tube delivered by the extruder, this mold then being in the desired condition of proximity to the mold which has preceded it. Thereby the machine of that application achieves a minimum waste of material, even with as few as three molds and despite the fact that the molds are more widely spaced one from the other on the remainder of their cyclic closed path of travel.

In one embodiment of the machine of that application the variation in the radius of gyration of the molds about the axis of the mold carrier is obtained by mounting the cradles on the carrier by means of hinged or articulated arms, i.e., at the ends of rods, which are hingedly coupled to cranks constituting spokes of the carrier.

Such a machine, while operating very satisfactorily notwithstanding the small number of molds involved, does not permit wide latitude in changing in the dimensions of the molds.

It is consequently an object of the present invention to provide a machine having the advantages of the machine of application Ser. No. 774,385, namely minimum loss of raw material between successive molds and a small number of molds such as three, and having the additional advantage that the length or other dimensions of the molds which can be employed in a given machine may be varied over wide limits.

It is another object of the invention to provide such a machine of small dimensions and hence with a small radius of rotation for the molds. It is still another object of the invention to provide a machine in which the guiding of the molds is effected in a highly dependable way and with reduced stress on the elements involved.

Hereafter the element which supports the molds will be described as the turntable.

By reference to the machines of the prior art hereinabove mentioned, the machine of the present invention is characterized by the fact that the mold-carrying cradles are articulated at each end on a rod which in turn is pivotally connected to a crank or spoke fixed on the shaft of the turntable, and by the fact that guiding of the cradles lengthwise of the rectilinear portion of their motion and their correct orientation during that portion of their motion are assured by three cams and followers. The first of these followers is constrained by a closed groove constituting a face cam, and cooperates successively with the other two followers whose cams or guide surfaces take the form of open grooves, each engaging its follower over only a part of the closed cycle of motion of that follower.

In a preferred embodiment the machine according to the invention is characterized additionally by the fact that the point of articulation of each rod to its crank is adjustable between the limits lengthwise of the crank.

The invention will now be further described in terms of a preferred exemplary embodiment thereof and with reference to the accompanying drawings, in which:

FIGS. 1 and 2 are diagrams useful in explaining the invention;

FIG. 3 is a sectional view in elevation of the machine, the extruder being however omitted; and FIG. 4 is a sectional view illustrating the construction of the cam followers.

In FIGS. 1 and 2, wherein the mounting and guiding of the cradles on the turntable is schematically indicated, O is the axis of rotation of the turntable 14 and $xx'$ is the axis along which the plastic material is extruded in tubular form, by an extruder not shown, for blowing in the molds of the machine.

The machine comprises three mold-bearing cradles 1, 1*I*, and 1*b*. It also comprises, as part of the turntable above referred to, three spokes or crank arms 2, 2*a*, and 2*b*. Connecting rods 3, 3*a*, and 3*b* are hingedly connected to these crank arms respectively. The points 4, 4*a*, and 4*b* of articulation of these connecting rods and crank arms are adjustable lengthwise of the crank arms so that the effective length of the crank arms is adjustable. The cradles 1, 1*a*, and 1*b* are in turn hingedly, i.e., pivotally, connected to the connecting rods 3, 3*a*, and 3*b* at the outer ends of the latter, the hinge points being denoted 5, 5*a*, and 5*b*. In the schematic representation of FIGS. 1 and 2, the cradles are shown as including, as rigid elements thereof, arms 1', 1*a*', and 1*b*' for this purpose.

In the operation of the machine, the turntable 14 to which the crank arms 2, 2*a*, and 2*b* are fixed is caused to rotate in the sense of the arrow F. Thus the hinge points 4, 4*a*, and 4*b* between the connecting rods 3, 3*a*, and 3*b* and their respective crank arms 2, 2*a*, and 2*b* describe a circle of adjustable radius R having its center at O. During this motion the connecting rods 3, 3*a*, and 3*b* carry with them the axes 5, 5*a*, and 5*b* of articulation of the mold cradles to the connecting rods. These hinge axes are constrained by first followers 7, 7*a*, and 7*b* to move in a closed path 6 defined by a stationary face cam, indicated at 30 in FIG. 3. The followers 7, 7*a*, and 7*b* are journaled on the pivot axes 5, 5*a*, and 5*b*. Two arms 15 and 16 fixed with respect to each other and to the arm 1' of cradle 1 carry auxiliary followers 8 and 9. In similar fashion, arms 15*a* and 16*a* fixed with respect to each other and to arm 1*a*' of cradle 1*a* carry auxiliary followers 8*a* and 9*a*, and arms 15*b* and 16*b* fixed with respect to each other and to arm 1*b*' of cradle 1*b* carry auxiliary followers 8*b* and 9*b*. For simplicity the followers 7, 7*a*, and 7*b* have been shown in FIG. 1 as coaxial with the axes 5, 5*a*, and 5*b*. While this is an advantageous form of construction, it is not essential to the invention.

With the hinge axes 5, 5*a*, and 5*b* carried and guided lengthwise of the closed path 6 by the followers 7, 7*a*, and 7*b*, there remain to be provided means to orient the cradles correctly along their trajectories and in particular to keep the molds coaxial with the extrusion axis $xx'$ while the followers 7, 7*a*, and 7*b* execute the rectilinear portion of their motion along the path 6. This result is obtained by cooperation of the main followers 7, 7*a*, and 7*b* with the auxiliary followers 8 and 9, 8*a* and 9*a* and 8*b* and 9*b*.

Thus with the condition of affairs illustrated in FIG. 1, the cradle 1 is being guided by the followers 7 and 8, the first being engaged in the straight portion of the path 6 and the second following a straight path 11 defined by a cam or groove which is parallel to the straight portion of the path 6 but which is below the plane of the figure. In this figure it will also be seen that the cradle 1*a* is being guided by its main follower 7*a* still in the straight portion of the path 6 and by its follower 9*a* after entry of the latter into a path 10, defined by a cam or groove 31, whereas the follower 8*a* has emerged from the path 11, which terminates at 11'. In the position shown in FIG. 1, it can be seen that the two molds 1 and 1a are coaxial, the axes of the molds being in alignment with the extrusion axis $xx'$.

A slightly later phase in the rotation of the turntable 14 is illustrated in FIG. 2. There the cradle 1 continues to be guided along the rectilinear portion of its path, collinearly with the axis $xx'$, by followers 7 and 8 in the straight portion of paths 6 and 11. Cradle 1*a* has however departed from collinearity with axis $xx'$; its main follower 5*a* has entered the curved portion 6*a* of cam groove 6.

The path 10 of the followers 9, 9*a*, and 9*b* defined by cam 31 extends from 10*a* to 12, counterclockwise as seen in FIG. 2, whereas the path of followers 8, 8*a*, and 8*b* extends counterclockwise from 13 to 11'. The cam defining this path is, as previously stated, beneath the plane of the figure. The path 6 of the followers 7, 7*a*, and 7*b* on the other hand extends over 360° about the axis O, although it is not circular. Before the followers 9, 9*a*, and 9*b* reach the end 12 of their path 10, the followers 8, 8*a*, and 8*b* reenter their path at the point 13. This ensures again correct guidance of the mold cradles. It can thus be seen that in each of FIGS. 1 and 2 the cradle 1*b* is being guided by its followers 7*b* and 8*b*. These two followers continue to assure together correct guidance of the cradle 1*b* until cradle 1*b* reaches substantially the position shown for cradle 1 in FIG. 2, where its guidance will be assumed by followers 7*b* and 9*b*.

It will be observed that the length of the radius R of the turntable (i.e., of the arms 2, 2*a*, and 2*b*) is of substantially the same order as the lengths of the arms 15 and 16. Under these conditions the use of the two auxiliary followers for guidance of the main follower and their alternate cooperation with the central one, but over separate fractions of the 360° angle about the center O, makes it possible to reduce substantially the size of the machine and in particular the length of the straight central portion of the path 6 for the main follower without changing the rectilinear portion of the path followed between molds. This reduction is substantially equal to the distance between the followers 7 and 8, which means a reduction of some 30 percent in the straight portion of the path 6. This is highly advantageous and makes it possible to mount on such a machine molds whose length is for example of the same order as the maximum radius of the turntable or indeed greater than that radius, as had not heretofore been possible, in particular in machines accommodating a large number of molds.

In other words, the machine according to the invention is much more compact. It is moreover lighter. Moreover, a calculation shows that by variation of the radius R it is possible, without changing their cams and their followers, to vary within wide limits the length of the molds which can be mounted on the machine.

In a machine according to the invention which has been satisfactorily operated, the ratio of the maximum mold length (approximately 360 mm.) to the minimum mold length has been 1.4, the maximum and minimum values of R being respectively 225 and 146 mm.

The distance separating the auxiliary followers from their associated main followers being in practice approximately equal to the minimum value of the radius R, it will be apparent that the guidance which these followers produce is very stable.

FIG. 3 represents the machine schematically shown in FIGS. 1 and 2, reversed however left for right. In FIG. 3 the mold-carrying cradles are shown at 1, 1a, and 1b substantially in the positions shown for them in FIG. 2.

The turntable 14 is driven by a shaft 20 from a motor via a suitable reduction gear. The crank arms 2, 2a, and 2b are fixed to this shaft and the connecting rods 3, 3a, and 3b are articulated to these crank arms. The effective length of the crank arms is adjustable by means of sliding joints 21 whose position is adjustable by means of screws 22 engaging elements 23 fixed to the outer end of the crank arms.

It can be seen in FIG. 3 that the axes 5, 5a, and 5b of articulation between the rods 3, 3a, and 3b and the cradles coincide with those of the followers 7, 7a, and 7b. The cradles include as rigid elements thereof arms 24 journaled about the axes 5, 5a, and 5b and fixed to the arms 15 and 16 carrying the auxiliary followers.

The machine is supported on a base 26 which rests upon a carriage 27.

FIG. 4 shows the arms 15 and 16 which support the auxiliary followers 8 and 9. It will be observed that the followers 7 and 9 are at the same location lengthwise of their own axes, while follower 8 is axially displaced therefrom.

Auxiliary elements have been omitted from the drawings such as those which open and close the molds, these being optionally of known type.

It is also possible, in accordance with the invention, to use one or more turntables interchangeably mounted on the carriage and to change the molds of one turntable during operation of the machine with another turntable. The extruder and driving motor may be fixed as a unit with the shaft of the turntable coupled to the motor shaft when the turntable is in operating position.

With the dependable guidance provided by the wide separation of the followers, it is not necessary to provide guidance for the cradles at their two ends and it is sufficient to provide for each cradle three followers situated on the same side of the cradle by reference to a central symmetry plane of the machine.

The invention thus provides apparatus for blow molding hollow articles from tubular plastic material extruded along an axis, said apparatus comprising a plurality of molds, a first cam 30 having a closed profile, two cams 31 and 11 having open profiles, three cam followers such as 7, 8, and 9 coupled to each of said molds, each of said followers engaging a separate one of those cams, and drive means to drive the molds in a closed path under guidance of their respective followers. The drive means may comprise a shaft 20 and a separate linkage coupling the shaft to each of the followers such as follower 7 engaging the closed profile cam. The linkage may include for each mold an arm such as the arm 2 fixed to the shaft 20 and a rod such as the rod 3 connecting the arm to the follower such as 7 engaging the closed profile cam. Means may be provided, as shown at 21 and 22 in FIG. 3, to adjust the point of coupling 4 of the rod 3 lengthwise of the arm 2, and similarly of course for the other molds. The cam 30 having a closed profile includes a portion parallel to the axis of the extruder, and so does at least one of the open profile cams 31 and 11. For each mold, the spacing of the follower engaging the closed profile cam 30 from the associated followers, such as followers 8 and 9 for the mold 1, which engage the open profile cams 31 and 11, may be of the same order of magnitude as the length of the arm affixed to the shaft.

The means for pinching the ends of the tube section trapped in each mold which means may be part of the mold itself) and the means for delivering air or other gas under pressure to the interior of such tube sections in order to blow mold them may be conventional in nature and have not been shown in the drawings.

While the invention has been hereinabove described in terms of a presently preferred embodiments, the invention itself is not limited thereto but rather comprehends all modifications of and departures from that embodiment properly falling within the scope of the appended claims.

I claim:

1. Apparatus for blow molding hollow articles from tubular plastic material extruded along an axis, said apparatus comprising a plurality of molds, a first cam having a closed profile, two cams having open profiles, three cam followers coupled to each of said molds, each of said followers being engageable with a separate one of said cams, a drive shaft, and, for each of said molds, an arm fixed to said shaft and a rod pivotally connecting said arm to the follower engaging said closed profile cam.

2. Apparatus according to claim 1 including means to adjust the point of coupling of said rod lengthwise of said arm.

3. Apparatus according to claim 1 wherein the spacing of said follower engaging said closed profile cam from said followers engaging said open profile cams is of the same order of magnitude as the length of said arm.

4. Apparatus for blow molding hollow articles from tubular material extruded along an axis, said apparatus comprising a stationary face cam having a closed profile including a straight portion parallel to said axis, a plurality of stationary face cams having open profiles each including a straight portion parallel to said first-named straight portion, and a plurality of mold cradles, said machine further comprising for each of said cradles a first follower engaging said closed profile cam, auxiliary followers engageable each with a separate one of said open profile cams, and means supporting said cradle and supporting said followers for rotation about axes fixed with respect to each other and to said cradle, said machine further comprising means to drive said first followers through the closed path defined by said cam having a closed profile.

* * * * *